(12) United States Patent
Schweitzer et al.

(10) Patent No.: US 12,344,159 B2
(45) Date of Patent: Jul. 1, 2025

(54) VEHICLE HEADLIGHT

(71) Applicant: Docter Optics SE, Neustadt an der Orla (DE)

(72) Inventors: Hagen Schweitzer, Neustadt an der Orla (DE); Sebastian Erbes, Neustadt an der Orla (DE); Markus Winkler, Neustadt an der Orla (DE)

(73) Assignee: DOCTER OPTICS SE, Neustadt An der Orla (DE)

( * ) Notice: Subject to any disclaimer, the term of this patent is extended or adjusted under 35 U.S.C. 154(b) by 90 days.

(21) Appl. No.: 18/187,340

(22) Filed: Mar. 21, 2023

(65) Prior Publication Data

US 2023/0302986 A1 Sep. 28, 2023

(30) Foreign Application Priority Data

Mar. 23, 2022 (DE) ...................... 10 2022 106 917.6
Jun. 5, 2022 (DE) ...................... 10 2022 114 211.6

(51) Int. Cl.
*B60Q 1/04* (2006.01)
*F21S 41/00* (2018.01)
*F21S 41/153* (2018.01)
*F21S 41/36* (2018.01)
*G02B 19/00* (2006.01)

(52) U.S. Cl.
CPC ............... *B60Q 1/04* (2013.01); *F21S 41/00* (2018.01); *F21S 41/153* (2018.01); *F21S 41/36* (2018.01); *G02B 19/00* (2013.01)

(58) Field of Classification Search
CPC ................ G02B 19/00; G02B 19/0014; G02B 19/0066; B60Q 1/543; B60Q 1/143; B60Q 2400/50; F21S 41/25; F21S 41/143
See application file for complete search history.

(56) References Cited

U.S. PATENT DOCUMENTS

| 9,599,301 B2 | 3/2017 | Brendle |
| 2006/0083013 A1 | 4/2006 | Wanninger et al. |
| 2008/0080207 A1 | 4/2008 | Specht et al. |

(Continued)

FOREIGN PATENT DOCUMENTS

| CN | 107131462 | 9/2017 |
| CN | 107685679 A1 | 2/2018 |

(Continued)

OTHER PUBLICATIONS

M. Knöchelmann, et al., "Aktiver Scheinwerfer mit DMD-Technologie zur Erzeugung vollständiger Lichtverteilungen", VDI-Berichte Nr. 2323, 2018, pp. 61-78, DOI: 10.15488/3975.

(Continued)

*Primary Examiner* — Elmito Breval
(74) *Attorney, Agent, or Firm* — Carter, DeLuca & Farrell LLP (57) ABSTRACT

The invention relates, inter alia, to a vehicle headlight having a lens arrangement, wherein the lens arrangement includes a first lens (input lens), a second lens (first middle lens), at least a third lens (second middle lens), and a front lens, wherein the second lens (first middle lens) is arranged in the light path between the first lens (input lens) and the front lens, and wherein the at least third lens (second middle lens) is arranged in the light path between the second lens (first middle lens) and the front lens.

14 Claims, 5 Drawing Sheets

(56) References Cited

U.S. PATENT DOCUMENTS

| | | | |
|---|---|---|---|
| 2019/0086050 A1 | 3/2019 | Dikau et al. | |
| 2020/0292143 A1 | 9/2020 | Spinger et al. | |
| 2022/0065416 A1 | 3/2022 | Qiu et al. | |
| 2022/0268413 A1 | 8/2022 | Lee | |
| 2022/0373151 A1 | 11/2022 | Zhang et al. | |
| 2023/0003356 A1* | 1/2023 | Rizzi | F21V 5/008 |

FOREIGN PATENT DOCUMENTS

| | | | |
|---|---|---|---|
| CN | 109814233 A * | 5/2019 | G02B 13/0035 |
| DE | 10 2008 003 706 A1 | 7/2009 | |
| DE | 10 2006 021 694 B4 | 10/2012 | |
| DE | 10 2017 204097 | 9/2018 | |
| DE | 11 2019 003 574 T5 | 3/2021 | |
| DE | 10 2020 119 939 A1 | 2/2022 | |
| EP | 3388734 | 10/2018 | |
| WO | 2014/114308 | 7/2014 | |
| WO | 2017/207079 | 12/2017 | |
| WO | 2019/179571 A1 | 9/2019 | |
| WO | 2020/064964 A1 | 4/2020 | |
| WO | 2020/250758 A1 | 12/2020 | |
| WO | 2021/008647 A1 | 1/2021 | |

OTHER PUBLICATIONS

Audi—Vorsprung durch Technik, https://web.archive.org/web/20150109234745/http://www.audi.de/content/de/brand/de/vorsprung_durch_technik/content/2013/08/Audi-A8-erstrahl, Jun. 28, 2022.

M. Bass, et al., "Handbook of Optics, Fundamentals, Techniques, & Design", Second edition, vol. 1, McGraw-Hill, Inc., 1995.

W. Huhn, "Anforderungen an eine adaptive Lichtverteilung fur Kraftfahrzeugscheinwerfer im Rahmen der ECE-Regelungen", Herbert Utz Verlag, 1999.

Franz-Josef Kalze und Dr. David Brunne, "LED im Fahrzeug: Die Rolle der Matrixscheinwerfer und was sie leisten", https://www.next-mobility.de/led-im-fahrzeug-die-rolle-der-matrixscheinwerfer-und-was-sie-leisten-a-756004/, Jun. 28, 2022.

Matrix-LED—und Laserlicht bietet viele Vorteile, https://www.all-electronics.de/automotive-transportation/matrix-led-und-laserlicht-bietet-viele-vorteile.html, Jun. 28, 2022.

International Search Report and Written Opinion Issued Jun. 15, 2021 For PCT/DE2021/100252.

International Preliminary Report On Patentability Issued On Sep. 20, 2022 For Corresponding PCT Application No. PCT/DE2021/100252.

* cited by examiner

VEHICLE HEADLIGHT

PRIORITY CLAIM

This application claims priority of the German patent application DE 10 2022 106 917.6, filed on Mar. 23, 2022, and of the German patent application DE 10 2022 114 211.6, filed on Jun. 5, 2022, which are explicitly incorporated herein by reference.

FIELD OF THE DISCLOSURE

The disclosure relates to a motor vehicle having a vehicle headlight. The disclosure also relates to a vehicle headlight, for example a motor vehicle headlight, and to a method of manufacturing a vehicle headlight. A vehicle headlight within the meaning of the present disclosure relates for example to so-called matrix light or adaptive high beam and/or driving assistance systems and projectors, for example for projecting information and/or symbols onto the environment of the motor vehicle, for example onto the environment in front of the motor vehicle. In addition, the disclosure also relates to a lens arrangement for a vehicle headlight.

BACKGROUND

Examples of matrix light or adaptive high beam can be found at web.archive.org/web/20150109234745/http://www.audi.de/content/de/brand/de/vorsprun g_by_technology/content/2013/08/Audi-A8-emerges-in-new-light.html (retrieved on on Sep. 5, 2019), www.all-electronics.de/matrix-led-und-laserlicht-bietet-viele-vorteile/(retrieved on Sep. 2, 2019), and www.next-mobility.news/led-im-fahrzeug-die-rolle-dermatrixscheinwerfer-und-was-sie-leisten-a-756004/(retrieved on Sep. 2, 2019). It is proposed to use a segmented light source in conjunction with a lens arrangement to implement matrix light or adaptive high beam. In this context, it is desirable, for example, to design the lens arrangement in such a way that it is possible to image the segmented light source (e.g. LED pixel approx. 50 μm×50 μm) on the road, so that on the one hand an illumination task (e.g. bright-dark-boundary) and on the other hand an information task (projection of symbols) can be fulfilled. The combination of projection of information and illumination discloses in relation to DMD (Digital Micromirror Device) headlights, for example, VDI Reports No. 2323, 2018, "Active headlight with DMD technology for generating complete light distributions," www.repo.uni-hannover.de/bitstream/handle/1234 56789/4009/Active %20Headlight %20with %20DMD %20Technology %20for %20Generation.pdf?sequence=3&isAllowed=y (see page 76) (accessed Mar. 22, 2022).

The DE 10 2020 119 939 A1 concerns a headlight for a vehicle, comprising:
- a lens assembly having a first lens, a second lens, and a third lens, and
- a light source for emitting light beams through the lens assembly, wherein the first lens has a first light input surface, for introducing the light rays from the light source into the lens arrangement, and a first light output surface, the second lens has a second light input surface and a second light output surface and the third lens has a third light input surface and a third light output surface for directing the light rays out of the lens assembly into the vicinity of the headlight, and wherein the first lens, the second lens and the third lens each have a positive refractive power for converging the light rays.

The DE 11 2019 003 574 T5 discloses an adjustment method based on a PBS (polarizing beam splitter) beam splitter for the adaptive high beam function and its vehicle light module. The vehicle light module integrated with a camera includes a light control system comprising a light source system and light control elements. Part of the light emitted by the light control system passes through the PBS beam splitter to form the illumination light shape. Another part of the light emitted from the light control system is reflected by the PBS beam splitter in the opposite direction of the integrated circuit with light-sensitive chips to prevent the light from disturbing the light-sensitive chips. Ambient light enters the imaging lens array in the reverse direction of the illumination light path. Part of the ambient light is reflected from the PBS beam splitter to the integrated circuit with light-sensitive chips to form the information source for the light control system to perform dynamic control.

WO 2020/250758 A1 discloses an optical unit for a vehicle lamp, the optical unit comprising a plurality of lenses and a lens holder. The plurality of lenses each have a lens shape and a lens flange provided at the edge of the lens shape, wherein the lens flanges of the lenses are stacked along an optical axis, and the lens shapes of the lenses are arranged along the optical axis. The lens holder holds the plurality of lenses and has a first holder component and a second holder component connected to each other.

The WO 2020/064964 A1 concerns an optical projection system for a vehicle module, consisting of:
- an input assembly comprising a lens capable of receiving light rays generated by a light source and focusing them;
- an intermediate group comprising a first meniscus lens directly receiving light rays from the optical input group and a second lens having a convex dioptric output interface, the meniscus cavity, the first lens oriented away from the second lens;
- an output group with a third meniscus lens receiving light rays from the intermediate optical group, and
- a biconvex or planoconvex fourth lens whose planar dioptric interface faces the third lens, wherein the meniscus cavity of the third lens being oriented toward the fourth lens.

MLAs can also be used to project information onto the road ahead of a motor vehicle, for example, see www.elektronik net.de/automotive/assistance-systems/microlens-array-technik-fuer-projizierte-beleuchtung.166457.html (accessed Mar. 22, 2022). With regard to light distributions for motor vehicle headlights, reference is made to the article by Wolfgang Huhn: "Anforderungen an eine adaptive Lichtverteilung für Kraftfahrzeugscheinwerfer im Rahmen der ECE-Regelungen," www.utzverlag.de/assets/pdf/31595 all.pdf, Herbert Utz Verlag GmbH 1999, ISBN 3-89675-595-1.

SUMMARY OF THE DISCLOSURE

The present disclosure relates to a lens arrangement and/or a vehicle headlight and/or a motor vehicle. For example, it is provided that a lens arrangement comprises a first lens (input lens, a lens of the lens arrangement facing or to be faced to an illumination matrix, such as an LED matrix), a second lens (first middle lens), at least one third lens (second middle lens) and a front lens (a lens of the lens arrangement facing or to be faced away from a light source, such as the illumination matrix), wherein the second lens (first middle lens) is arranged in the light path between the first lens (input lens) and the front lens, and wherein the at least third lens (second middle lens) is arranged in the light path between the second lens (first middle lens) and the front lens.

DETAILED DESCRIPTION

The disclosure concerns a lens arrangement and/or a vehicle headlight and/or a motor vehicle. For example, it is provided that a lens arrangement comprises a first lens (input lens; a lens of the lens arrangement facing or to be faced to an illumination matrix, such as an LED matrix), a second lens (first middle lens), at least one third lens (second middle lens) and a front lens (a lens of the lens arrangement facing or to be faced away from a light source, such as the illumination matrix), wherein the second lens (first middle lens) is arranged in the light path between the first lens (input lens) and the front lens, and wherein the at least third lens (second middle lens) is arranged in the light path between the second lens (first middle lens) and the front lens.

The present disclosure relates to a lens arrangement or a vehicle headlight or a motor vehicle. In this context, it is provided, for example, that a lens arrangement comprises a first lens (input lens; a lens of the lens arrangement facing or to be faced to a light source, such as an illumination matrix), a second lens (first middle lens), at least a third lens (second middle lens), and a front lens (a lens of the lens arrangement facing or to be faced away from the illumination matrix), wherein the second lens (first middle lens) is arranged in the light path between the first lens (input lens) and the front lens, and wherein the at least third lens (second middle lens) is arranged in the light path between the second lens (first middle lens) and the front lens.

The first lens (input lens) has an input lens input surface and an input lens output surface. For example, the first lens (input lens) is made of inorganic glass. In one embodiment, the input lens entrance surface is concavely curved. In one embodiment, the input lens exit surface is convexly curved.

The second lens (first middle lens) has a middle lens entrance surface and a middle lens exit surface. For example, the second lens (first middle lens) consists of inorganic glass. In one embodiment, this middle lens entrance surface is convexly (for example spherically) curved. This middle lens exit surface is convexly curved (for example spherically) in one embodiment.

The third lens (second middle lens) has a middle lens entrance surface and a middle lens exit surface. For example, the third lens (second middle lens) consists of plastic/polymer, for example polycarbonate. In one embodiment, this middle lens entrance surface is aspherically concave curved. In one embodiment, this middle lens exit surface is aspherically convexly curved or a lens freeform, wherein the lens freeform may have at least one convexly curved region and at least one concavely curved region.

The front lens has a front lens entrance surface and a front lens exit surface. For example, the front lens consists of plastic or polymer, for example polycarbonate. In one embodiment, the front lens entrance surface is aspherically convexly curved or a lens freeform. In one embodiment, the front lens exit surface is aspherically convexly curved or a lens freeform.

In a further embodiment of the disclosure the front lens consists of polymer (e.g. PMMA or Zeonex E48R/T62R). In a further embodiment, the front lens has a positive focal length and/or an Abbe number v>50.

The first lens (input lens) for example comprises a positive focal length. The second lens (first middle lens) for example comprises a positive focal length. The third lens (second middle lens) for example comprises a negative focal length. The front lens comprises a positive focal length.

In an embodiment, the second lens (first middle lens) is arranged at the edge of the third lens (second middle lens).

In an embodiment, the first lens (input lens) and/or second lens (first middle lens) are ground lenses.

In certain applications, it may be provided that the first lens (input lens) and/or second lens (first middle lens) are press-molded on both sides.

In a further embodiment, the second lens (first middle lens) has an Abbe number v>50. In a further embodiment, the third lens (second middle lens) has an Abbe number v<50.

In an embodiment, the first lens (input lens), the second lens (first middle lens), the at least third lens (second middle lens), and the front lens are arranged in a tube. In a further embodiment, the tube is opaque. In an embodiment, the lenses are or are attached in/to a or the tube, for example by bonding. The tube is, for example, made of a material (polymer or metal) having a coefficient of expansion suitable to support the athermalization of the combined focal length of the front lens and third lens (at least second middle lens) described below. In a further embodiment, it is provided that the tube widens in the direction of the front lens, for example by an angle γ, or tapers in the direction of the input lens, for example by an angle γ. In further embodiment, the angle γ, is not less than 1°. In further embodiment, the angle γ is not greater than 10°, for example not greater than 5°. This may involve a portion of the tube or a significant portion of the tube.

The tube may be part of a housing. Such a housing may, for example, additionally comprise a mounting flange and/or further elements for support or implementation with respect to a mounting of the lens arrangement in a vehicle headlight or motor vehicle headlight.

In an embodiment, the lens arrangement has a focal length between 10 mm and 40 mm.

The lens arrangement may have an aperture. For example, the aperture may be either between the third lens (at least second middle lens) and the front lens, or in front of the front lens. In an embodiment, the aperture number is no greater than 0.8. In a further embodiment, the lens arrangement images an illumination matrix at a distance of between 2 m and 30 m.

The lens arrangement comprises an achromatization for reducing color fringes in the wavelength range from 450 nm to 645 nm, which can be achieved, for example, mainly by means of the second lens (first middle lens) and/or the third lens (at least second middle lens). The color error is less than 0.04° in the above-mentioned wavelength range or less than 7 mm at a distance of 10 m from the lens assembly or the lens arrangement. In a further embodiment, the second lens (first middle lens) and the at least third lens (second middle lens) serve for achromatization.

In a further embodiment, the respective focal lengths of the front lens and the at least third lens (second middle lens) are selected such that they almost cancel each other out (either combined focal length>250 mm or ≤−250 mm). This also (approximately) cancels out temperature dependencies of the individual (respective) focal lengths of the two lenses (within the framework described in more detail below) (athermalization). Athermalization in the sense of the present disclosure means for example a focal length change of the lens of ≤4% per degree Kelvin change ΔT of temperature T or that with respect to the relative change of the combined focal length $f_{FL,L3}$ of front lens and third lens (second middle lens) the following applies:

$$\left| \frac{1}{f_{FL,L3}} \frac{\delta f_{FL,L3}}{\delta T} \right| \leq 4 \frac{\%}{°K}.$$

In a further embodiment, the combined focal length $f_{FL,L3}$ of front lens (FL) and third lens (second middle lens) (L3) is:

$$\frac{1}{f_{FL,L3}} = \frac{1}{f_{FL} - (L_{FL,L3}(1 + \alpha_{tu} \cdot \Delta T))} + \frac{1}{f_{L3}}$$

Where $f_{FL}$ denotes the focal length of the front lens, $f_{L3}$ denotes the focal length of the third lens (second middle lens), $L_{FL,L3}$ denotes the distance between the principal plane of the front lens on the light entrance side and the principal plane of the third lens (second middle lens) on the light exit side, and $\alpha_{tu}$ denotes the linear expansion coefficient of the tube.

In a further embodiment, the focal length $f_{FL}$ of front lens is $$\frac{1}{f_{FL}} = (n_{FL} - 1)$$

$$\left( \frac{1}{R_{FL,O}(1 + \alpha_{FL} \cdot \Delta T)} - \frac{1}{R_{FL,I}(1 + \alpha_{FL} \cdot \Delta T)} + \frac{(n_{FL} - 1)L_{FL}(1 + \alpha_{FL} \cdot \Delta T)}{n_{FL}R_{FL,O}R_{FL,I}(1 + \alpha_{FL} \cdot \Delta T)^2} \right)$$

Where $n_{FL}$ denotes the refractive index of the front lens, $\alpha_{FL}$ denotes the linear expansion coefficient of the front lens, $L_{FL}$ denotes the center thickness of the front lens, $R_{FL,O}$ denotes the radius of curvature of the light exit surface of the front lens in the case of a spherical surface or the best fit of the radius of curvature in a range of at least 5% and/or in a range of not more than 20% of the free surface diameter in the case of an aspherical surface or freeform surface, $R_{FL,I}$ the radius of curvature of the light entrance surface of the front lens in the case of a spherical surface, or the best fit of the radius of curvature in a range of at least 5% and/or in a range of not more than 20% of the free surface diameter in the case of an aspherical surface or freeform surface (see also: Douglas S. Goodman, "Handbook of Optics", Volume I, Chapter 1, page 1.59, McGraw-Hill, Inc., 1995).

In a further embodiment, the focal length $f_{L3}$ of the third lens (second middle lens) is $$\frac{1}{f_{L3}} = (n_{L3} - 1)$$

$$\left( \frac{1}{R_{L3,O}(1 + \alpha_{L3} \cdot \Delta T)} - \frac{1}{R_{L3,I}(1 + \alpha_{L3} \cdot \Delta T)} + \frac{(n_{L3} - 1)L_{L3}(1 + \alpha_{L3} \cdot \Delta T)}{n_{L3}R_{L3,O}R_{L3,I}(1 + \alpha_{L3} \cdot \Delta T)^2} \right)$$

Where $n_{L3}$ denotes the refractive index of the third lens, $\alpha_{L3}$ denotes the linear expansion coefficient of the third lens, $L_{L3}$ denotes the center thickness of the third lens, $R_{L3,O}$ denotes the radius of curvature of the light exit surface of the third lens in the case of a spherical surface or the best fit of the radius of curvature in a range of at least 5% and/or in a range of not more than 20% of the free surface diameter in the case of an aspherical surface or freeform surface, $R_{L3,I}$ the radius of curvature of the light entrance surface of the third lens in the case of a spherical surface or the best fit of the radius of curvature in a range of at least 5% and/or in a range of not more than 20% of the free surface diameter in the case of an aspherical surface or freeform surface.

For example, a fit as defined in the disclosure is used when an aspherical surface deviates at least 50 µm in height profile within the free diameter from a best-fit sphere.

In further embodiment, the lens arrangement includes passive athermalization in the temperature range of 20° C. to 90° C. in further embodiment, which may be achieved, for example, mainly by front lens and the third lens (at least second middle lens).

The front lens as well as the second lens (first middle lens) and third lens (at least second middle lens) can thus combine achromatization and athermalization of the lens array.

The disclosure also relates to a vehicle headlight having an illumination matrix with individually controllable illumination pixels, the vehicle headlight having a lens arrangement with one or more of the preceding features for imaging the illumination matrix. For example, it is provided that the illumination matrix and the lens arrangement are arranged with respect to each other in such a way that light of the illumination matrix can be or is irradiated into a light entrance surface of the input lens of the lens arrangement. In an embodiment, the illumination matrix comprises a plurality of independently (individually) controllable illumination pixels, for example not less than 10,000, for example not less than 100,000, for example not less than 1,000,000, of independently controllable illumination pixels.

A (light emitting) illumination pixel in the sense of this disclosure is for example a separately controllable area. A (light emitting) pixel in the sense of this disclosure is for example the smallest unit of a separately controllable area. A (light emitting) pixel in the sense of this disclosure has for example an extension (diagonal or side length) of at least 20 µm, for example at least 40 µm, for example at least 50 µm. A (light emitting) illumination pixel in the sense of this disclosure has for example an extension (diagonal or side length) of not more than 200 µm, for example not more than 100 µm, for example not more than 50 µm.

An illumination matrix within the meaning of this disclosure is, for example, an LED matrix or an OLED matrix. An illumination device within the meaning of the present disclosure is, for example, a blue light emitting LED matrix or OLED matrix. In addition, a phosphor (English phosphor) may be provided that emits white light when excited by the blue light from the LED or OLED. In one embodiment, the vehicle headlight comprises an LED matrix, wherein light can be irradiated into the lens arrangement by means of the LED matrix. A suitable illumination matrix can be taken, for example, from DE 10 2020 119 939 A1, DE 11 2019 003 574 T5 and WO 2020/064964 A1.

In an embodiment, the front lens has a light-emitting surface that guides out the light emitted into the lens arrangement by means of the illumination matrix and/or LED matrix.

In an embodiment, the lens arrangement with the illumination matrix is additionally used for adaptive or situation-dependent illumination of the environment in front of the motor vehicle and/or projection of light patterns, images and information on walls and/or the road (when integrated into a vehicle headlight) or the environment (of the lens arrangement and/or the vehicle headlight).

The disclosure further relates to a motor vehicle having an aforementioned vehicle headlight, wherein the illumination matrix is imagable as an illumination pattern onto an environment of the motor vehicle outside for example in front of the motor vehicle by irradiation of light of the illumination matrix into the input lens entrance surface.

In an embodiment, the motor vehicle comprises environment sensor technology for detecting the environment in front of the motor vehicle, the environment sensor technology being connected in terms of data technology to the vehicle headlight in such a way that the illumination pattern generated and/or emitted by means of the vehicle headlight is dependent on the output signals of the environment sensor technology.

In a further embodiment, the illumination pattern generated and/or emitted by means of the vehicle headlight is dependent on the speed of the motor vehicle. In a further embodiment, the motor vehicle comprises a navigation system, wherein the illumination pattern generated and/or emitted by means of the vehicle headlight is dependent on the position of the motor vehicle determined by means of the navigation system. In a further embodiment, the illumination pattern generated and/or emitted by means of the vehicle headlight is dependent on the temperature of the vehicle headlight.

The disclosure further relates to a method of manufacturing a lens arrangement for a vehicle headlight, for example a lens arrangement having the aforementioned characteristics, wherein an input lens having an input lens entrance surface and an input lens exit surface is made of inorganic glass and ground, wherein a first middle lens having a first middle lens entrance surface and a first middle lens exit surface is fabricated and ground from inorganic glass, wherein a second middle lens having a second middle lens entrance surface and a second middle lens exit surface is injection molded from plastic or polymer, wherein a front lens having a front lens input surface and a front lens output surface is injection molded from plastic or polymer, said input lens being placed in a tube, wherein said first middle lens and said second middle lens are joined together, wherein the combination of the first middle lens and the second middle lens is placed in the tube such that the first middle lens is positioned in the light path between the input lens and the second middle lens, and wherein the front lens is placed in the tube such that the front lens is connected to the second middle lens by the tube.

In an embodiment, the front lens is injection molded from plastic, for example according to a process disclosed in WO 2019/179571 A1.

In an embodiment, the third lens (second middle lens) is injection molded from plastic, for example according to a process disclosed in WO 2019/179571 A1.

A tube in the sense of this disclosure is for example a device or a housing on/in which the first lens (input lens), the second lens (first middle lens), the at least third lens (second middle lens) and the front lens are arranged. A tube in the sense of the present disclosure may be funnel-shaped in its interior. A tube in the sense of the present disclosure may be funnel-shaped in a partial area of its interior. A tube according to the present disclosure may be tapered in its interior in the direction of the entrance lens. A tube according to the present disclosure may be tapered in a portion of its interior in the direction of the entrance lens. A tube in the sense of the present disclosure may be configured in a partial region of its interior as a cylinder or cylinder-like. In alternative embodiments, a tube in the sense of this disclosure may also be a hollow cylinder or cylinder.

For the purposes of this disclosure, press-molding is to be understood for example as pressing a (for example optically effective) surface in such a way that subsequent finishing of the contour of this (for example optically effective) surface can be omitted or is omitted or is not provided. It is thus intended for example that a press-molded surface is not ground after the press-molding. Polishing, which does not affect the surface finish but the contour of the surface, may be provided. For example, the press-molding is carried out in accordance with a process as described in WO 2021/008647 A1. The process described in WO 2021/008647 A1 permits particularly precise press-molding.

Aspheres in the sense of this disclosure deviate at least 25 µm in height profile from the associated sphere.

Inorganic glass within the meaning of this disclosure is for example silicate glass. Glass within the meaning of this disclosure is for example glass as described in WO 2009/109209 A1. Glass within the meaning of this disclosure comprises for example
0.2 to 2 wt.-% $Al_2O_3$,
0.1 to 1 wt.-% $Li_2O$,
0.3, for example 0.4, to 1.5 wt.-% $Sb_2O_3$,
60 to 75 wt.-% $SiO_2$,
3 to 12 wt.-% $Na_2O$,
3 to 12 wt.-% $K_2O$ and
3 to 12 wt.-% CaO,
such as DOCTAN®.

Motor vehicle in the sense of the disclosure is for example a land vehicle which can be used individually in road traffic. Motor vehicles within the meaning of the disclosure are for example not limited to land vehicles with internal combustion engines.

Figure 1:
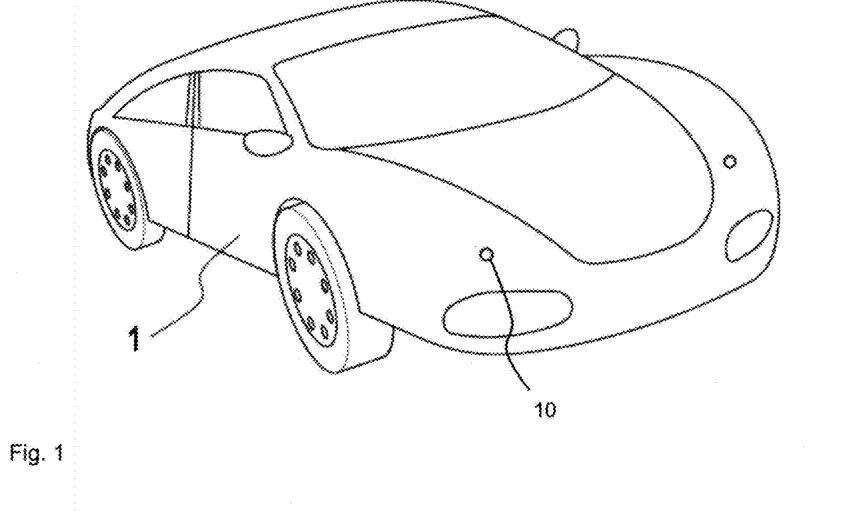
FIG. 1 shows an embodiment of a motor vehicle with a vehicle headlight.
Figure 2:
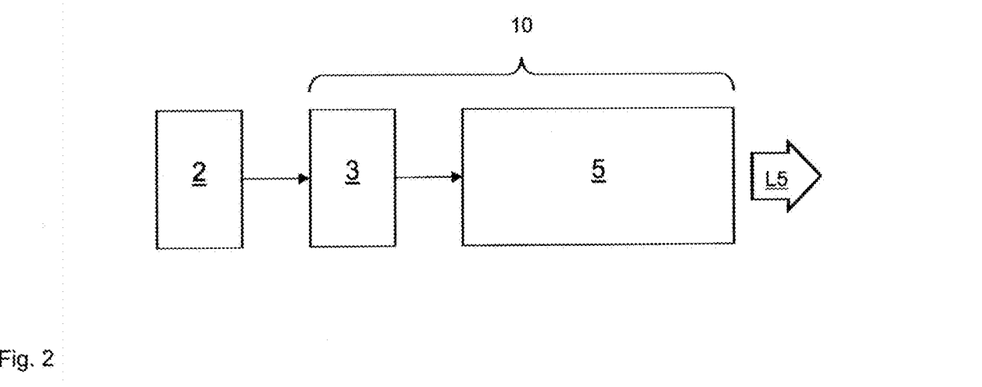
FIG. 2 shows an embodiment of a vehicle headlight according to FIG. 1 in principle.
Figure 3:
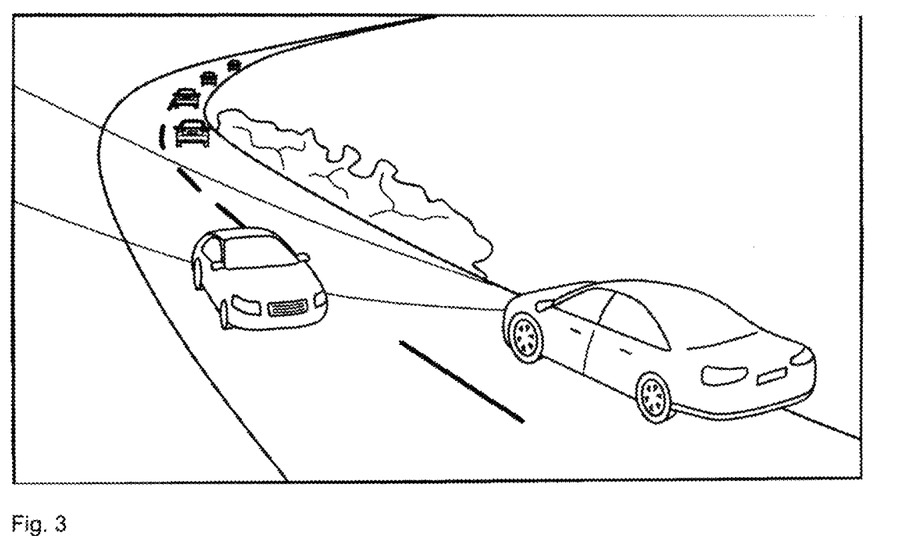
FIG. 3 shows an embodiment of matrix light or adaptive high beam.

FIG. 1 shows a motor vehicle 1 with an adaptive headlight or vehicle headlight 10, shown in more detail in FIG. 2, for situation- or traffic-dependent illumination of the surroundings or the road ahead of the motor vehicle 1 as a function of environment sensor technology 2. For this purpose, the vehicle headlight 10 has an illumination module/projection module 5, shown in more detail in FIG. 5, with a lens arrangement 50 and an illumination matrix 51. The illumination matrix is controlled by means of a headlight control 3 of the vehicle headlight 10 in conjunction with the lens arrangement 50 shown in FIG. 5 for generating a situation-dependent illumination pattern L5, for example for situation-dependent illumination of the surroundings of the motor vehicle 1 or of the area/environment in front of the motor vehicle 1. Examples of corresponding illumination patterns are shown in FIG. 3 and FIG. 4, where FIG. 3 is taken from
web.archive.org/web/20150109234745/http://www.au-di.de/content/de/brand/de/vorsprung_durch_technik/content/2013/08/Audi-A8-erstrahlt-in-neuem-Licht.html (accessed Sep. 5, 2019)
and FIG. 4 is taken from
www.all-electronics.de/matrix-led-und-laserlicht-bietet-viele-vorteile/(accessed Sep. 2, 2019).

Figure 4:
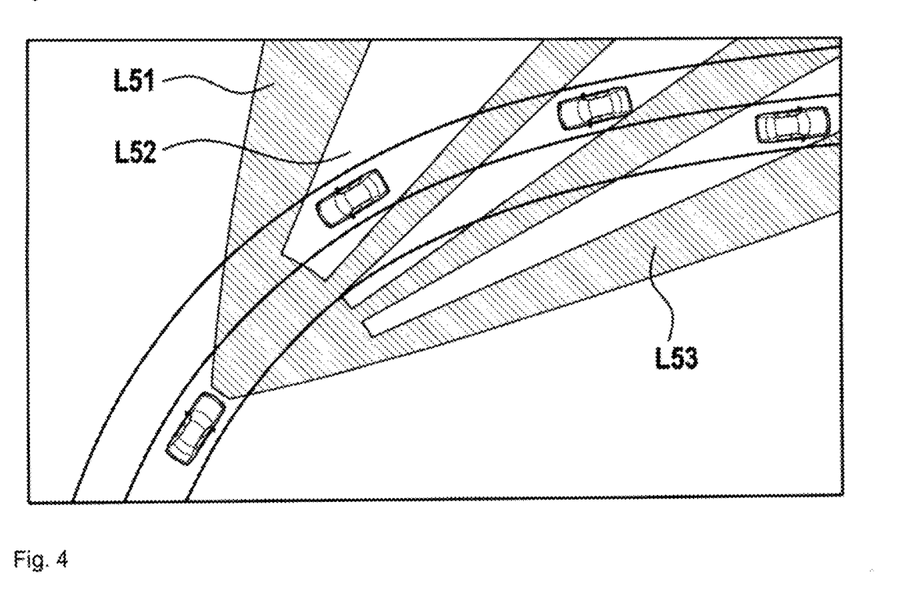
FIG. 4 shows another embodiment of matrix light or adaptive high beam.

In the embodiment according to FIG. 4, the illumination pattern L5 comprises at least one flared area L51, at least one dimmed area L52 and curve light L53.

Figure 5:
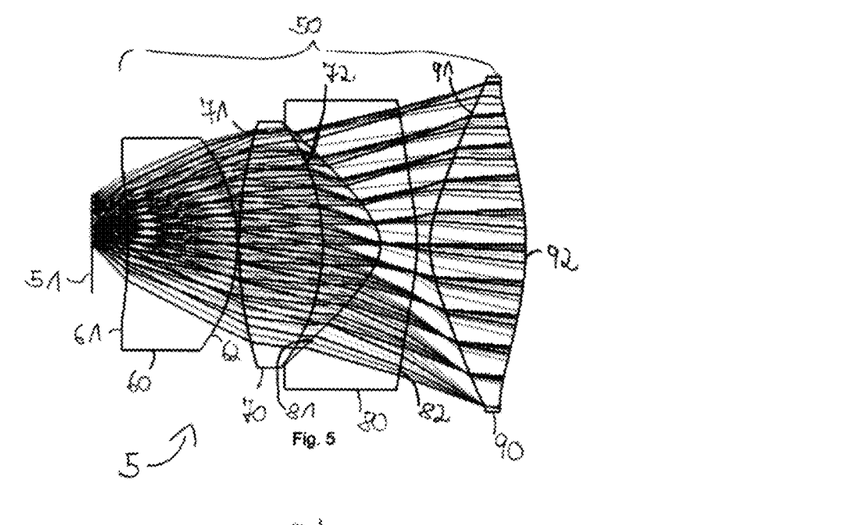
FIG. 5 shows an embodiment of an illumination module/projection module of a vehicle headlight according to FIG. 2.

FIG. 5 shows an embodiment of an illumination module/projection module 5. The illumination module/projection module 5 comprises a lens arrangement 50 and a (segmented) illumination matrix 51.

The lens arrangement 50 of FIG. 5 includes a first lens (input lens) 60 having an input lens entrance surface 61 and an input lens exit surface 62. The input lens entrance surface 61 is concavely curved. The input lens exit surface 62 is convexly curved. The first lens (input lens) 61 is a positive lens. The first lens (input lens) consists of inorganic glass based on the following mixture:
- 0.2 to 2 wt.-% $Al_2O_3$,
- 0.1 to 1 wt.-% $Li_2O$,
- 0.3, for example 0.4, to 1.5 wt.-% $Sb_2O_3$,
- 60 to 75 wt.-% $SiO_2$,
- 3 to 12 wt.-% $Na_2O$,
- 3 to 12 wt.-% $K_2O$ and
- 3 to 12 wt.-% CaO.

The lens arrangement 50 further comprises a (positive) second lens (first middle lens) 70 having a middle lens entrance surface 71 and a middle lens exit surface 72. This middle lens entrance surface 71 is convexly (for example spherically) curved. This middle lens exit surface 72 (for example spherically) convexly curved. The second lens (first middle lens) consists also of inorganic glass.

The lens arrangement 50 further comprises (a negative) third lens (second middle lens) 80 having a middle lens entrance surface 81 and a middle lens exit surface 82. This middle lens entrance surface 81 is aspherically concavely curved. In one embodiment, the middle lens exit surface 82 is aspherically convexly curved. In an embodiment, the second lens (first middle lens) 70 is peripherally adjacent to the third lens (second middle lens) 80.

The lens arrangement 50 further comprises a (positive) front lens 90 having a front lens entrance surface 91 and a front lens exit surface 92. The front lens entrance surface 91 is aspherically convexly curved. In one embodiment, the front lens exit surface is aspherically convexly curved. For example, the third lens (second middle lens) 80 and the front lens 90 consist of plastic/polymer, for example polycarbonate.

The (segmented) illumination matrix 51 according to FIG. 5 comprises a plurality of individually adjustable areas or pixels. For example, 10,000 pixels or more can be provided, which can be individually controlled by means of the headlight control 3 in the sense that they can be individually switched on or off, for example.

Figure 6:
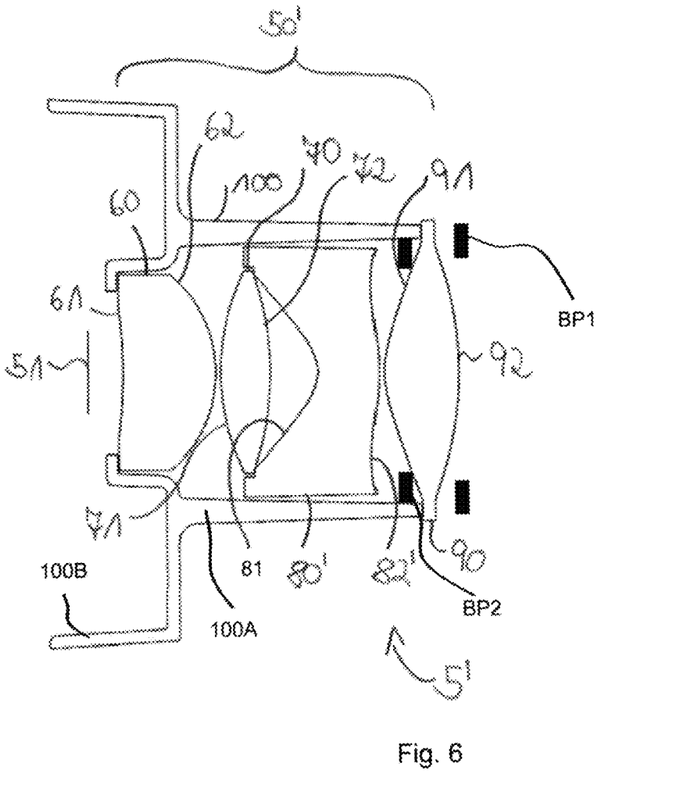
FIG. 6 shows a modified embodiment for an illumination module/projection module

FIG. 6 shows an illumination module/projection module 5' modified with respect to the illumination module/projection module 5 of FIG. 5, wherein a correspondingly modified lens arrangement 50' has a second middle lens 80' modified with respect to the second middle lens 80. The modified second middle lens 80' has a second middle lens exit surface 82' configured as a lens freeform, the lens freeform having a convexly curved region at the center of the second middle lens exit surface and a concavely curved region around this convex region.

In addition, FIG. 6 shows the arrangement of the input lens 60, the first middle lens 70, second middle lens 80' and the front lens 90 in a tube 100 A, which together with a flange 100 B is part of a housing 100. Furthermore, positions for possible apertures of the lens 50' are designated by BP 1 and BP 2.

Figure 7:
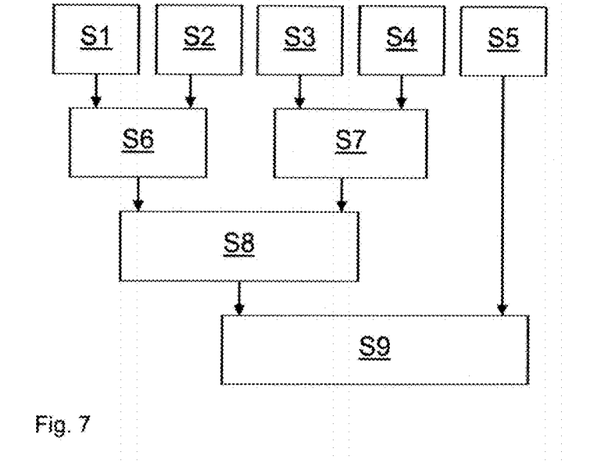
FIG. 7 shows an embodiment of a method for manufacturing an illumination module/projection module according to FIG. 6.

FIG. 7 shows an embodiment of a method for manufacturing an illumination module/projection module 5' as shown in FIG. 6, or a method for manufacturing a lens arrangement 50' (having aforementioned characteristics) for a vehicle headlight such as the vehicle headlight 10, wherein in a step S1, the tube 100A or the housing 100 is injection molded. In a step S2, the input lens 60 having the input lens entrance surface 61 and the input lens exit surface 62 is made of inorganic glass and is ground. In a step S3, the first middle lens 70 having the first middle lens entrance surface 71 and the first middle lens exit surface 72 is fabricated from inorganic glass and ground. In addition, in a step S4, the second middle lens 80' having the second middle lens entrance surface 81 and the second middle lens exit surface 82' is injection molded from plastic or polymer. In a step S5, the front lens 90 is injection molded with the front lens entrance surface 91 and the front lens exit surface 92 made of plastic or polymer, using for example the method described in WO 2019/179571 A1.

The input lens 60 is placed in the tube 100A in a step S6. In addition, in a step S7, the first middle lens 70 and the second middle lens 80' are placed together, wherein the combination of the first middle lens 70 and the second middle lens 80' being placed in the tube 100A in a step S8 such that the first middle lens 70 is arranged in the light path between the input lens 60 and the second middle lens 81'. This is followed by a step S9 in which the front lens 90 is placed in the tube 100A such that the front lens 90 is connected to the second middle lens 80' by means of the tube 100A. The fabricated lens arrangement 50 may now be assembled with an illumination matrix 51 to form an illumination module/projection module 5. Alternatively, however, the lens arrangement may find use with another light source.

Figure 8:
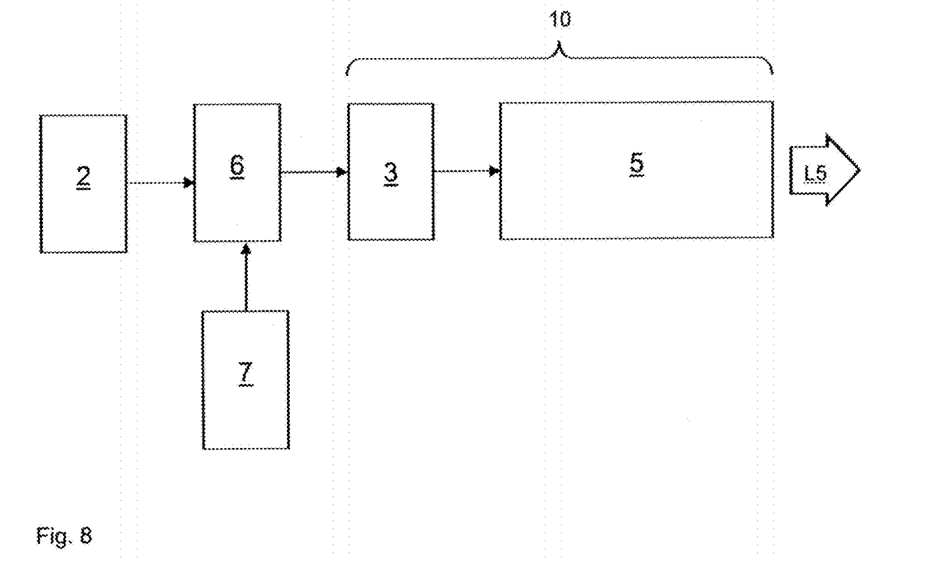
FIG. 8 shows an alternative way of controlling the vehicle headlight compared to the embodiment shown in FIG. 2.

FIG. 8 shows an alternative control of the vehicle headlight 10 compared to the embodiment example according to FIG. 2. Here, the block designated with reference sign 7 comprises further sources of information, such as a sensor for determining the temperature in the vehicle headlight or an engine control or a navigation system or a camera or (further) cameras or other sensors, for example for obstacle detection or other possible hazards, such as the high beam of an oncoming vehicle or game at the roadside. In one such situation-dependent embodiment, the illumination pattern generated and/or emitted by means of the vehicle headlight is dependent, for example, on the speed of the motor vehicle and/or on the position of the motor vehicle determined by means of the navigation system. In a further embodiment, the illumination pattern generated and/or emitted by means of the vehicle headlight is dependent on the temperature of the vehicle headlight. A control unit 6 is provided for coordinating and matching the information supplied from block 7 with the environment sensor technology 2 and for actuating the headlight control 3 as a function of the environment sensor technology 2 and the information supplied from block 7.

Figure 9:
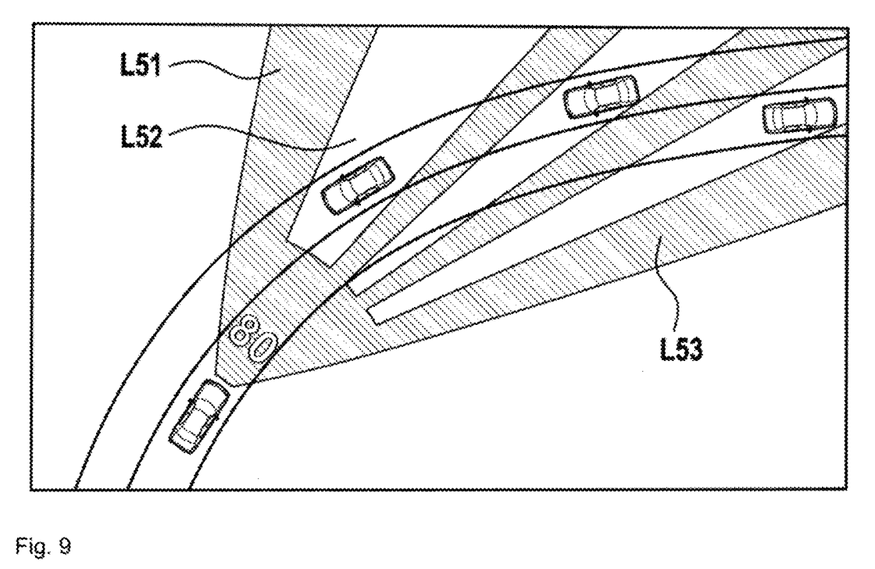
FIG. 9 shows a matrix light or adaptive high beam with an alternative design to the matrix light or adaptive high beam shown in FIG. 3, supplemented by the projection of information onto the road.
Figure 10:
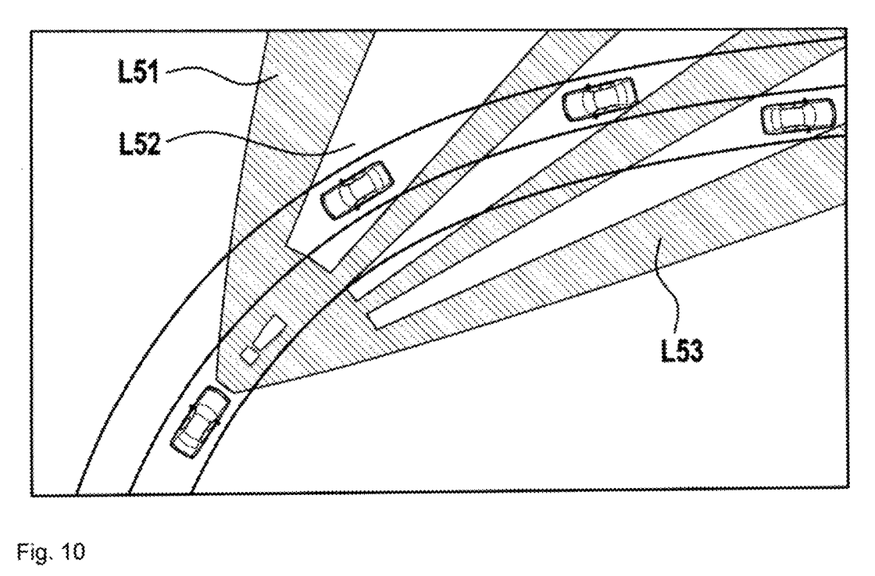
FIG. 10 shows a matrix light or adaptive high beam corresponding to the matrix light or adaptive high beam shown in FIG. 9 in the state of projecting a warning label onto the road.

FIG. 9 and FIG. 10 each show a matrix light or adaptive high beam that is designed as an alternative to the matrix light or adaptive high beam shown in FIG. 3, supplemented by the projection of information onto the road, such as the speed indication "80" in FIG. 9 (which is displayed, for example, when the maximum permissible speed is exceeded) or a warning label in the form of a "!" in FIG. 10.

This disclosure provides for an alternative vehicle headlight or a lens arrangement for an alternative vehicle headlight or a motor vehicle with an alternative vehicle headlight. For example, this disclosure provides for information reproduction, projected onto an environment of the motor vehicle, by means of a headlight for implementing an adaptive high beam or being implemented in a low beam. This disclosure also provides for improvement of driving assistance systems and projectors, for example for projecting information and/or symbols onto the environment of the motor vehicle, for example onto the environment in front of the motor vehicle. This disclosure provides for implementing a gradient of a bright-dark-boundary particularly precisely. A gradient in the sense of the present disclosure is for example a gradient in the sense of the technical lighting regulation FMVSS 118.

REFERENCE LIST

1 motor vehicle
2 environment sensor technology
3 headlight control
5, 5' illumination module/projection module
6 control unit
7 block
10 vehicle headlight
50, 50' lens arrangement
51 illumination matrix
60 first lens (input lens)
61 input lens entrance surface
62 input lens exit surface
70 second lens (first middle lens)
71 middle lens entrance surface
72 middle lens exit surface
80, 80' third lens (second middle lens)
81 middle lens entrance surface
82, 82' middle lens exit surface
90 front lens
91 front lens entrance surface
92 front lens exit surface
100 Housing
100A tube
100B
L5 (situation dependent) illumination pattern
L51 flared area
L52 dimmed area
L52 curve light
S1, S2, S3, S4, S5, S6 step

The invention claimed is:

1. A lens arrangement for a vehicle headlight, the lens arrangement comprising:
an input lens having a concavely curved input lens entrance surface and an input lens exit surface;
a plastic or polymer front lens having a front lens entrance surface and a front lens exit surface;
a first middle lens having a first middle lens entrance surface and a first middle lens exit surface, the first middle lens being arranged in a light path between the input lens and the front lens; and
at least a plastic or polymer second middle lens having a second middle lens entrance surface and a second middle lens exit surface, the at least second middle lens being arranged in a light path between the first middle lens and the front lens, the lens arrangement is configured such that a relative change in a combined focal length of a focal length of the front lens and a focal length of the second middle lens is no greater than 4% per degree Kelvin change in temperature.

2. The lens arrangement of claim 1, the first middle lens entrance surface being convexly curved and the second middle lens entrance surface being concavely curved.

3. The lens arrangement of claim 1, wherein the input lens exit surface being convexly curved.

4. The lens arrangement of claim 3, the second middle lens exit surface further comprising a concavely curved region.

5. The lens arrangement of claim 1, the first middle lens entrance surface being convexly curved and the second middle lens exit surface comprising a convexly curved region.

6. The lens arrangement of claim 5, the front lens entrance surface being aspherically convexly curved.

7. The lens arrangement of claim 1, the second middle lens entrance surface being aspherically concavely curved.

8. The lens arrangement of claim 7, the front lens entrance surface being aspherically convexly curved.

9. The lens arrangement of claim 8, the second middle lens exit surface comprising a concavely curved region.

10. The lens arrangement of claim 9, the second middle lens exit surface further comprising a convexly curved region.

11. The lens arrangement of claim 10, the first middle lens entrance surface being convexly curved.

12. The lens arrangement of claim 1, wherein the input lens and the first middle lens being made of inorganic glass.

13. The lens arrangement of claim 12, wherein the front lens entrance surface is aspherically convexly curved.

14. A vehicle headlight comprising:
an illumination matrix; and
a lens arrangement configured for imaging the illumination matrix, the lens arrangement comprising:
an input lens having a concavely curved input lens entrance surface, the input lens entrance surface facing the illumination matrix;
a front lens having a front lens entrance surface and a front lens exit surface;
a first middle lens having a first middle lens entrance surface and a first middle lens exit surface, the first middle lens being arranged in a light path between the input lens and the front lens; and
at least a second middle lens having an aspherically concavely curved second middle lens entrance surface and a second middle lens exit surface, the at least second middle lens being arranged in a light path between the first middle lens and the front lens;
wherein the lens arrangement being configured such that a relative change in a combined focal length of a focal length of the front lens and a focal length of the second middle lens is no greater than 4% per degree Kelvin change in temperature;
wherein the input lens and the first middle lens are made of inorganic glass, and the second lens and the front lens are made of plastic or polymer; and the second middle lens exit surface comprises a convexly curved region and a concavely curved region.

* * * * *